United States Patent [19]

Fukuda

[11] Patent Number: 4,491,189
[45] Date of Patent: Jan. 1, 1985

[54] COMBINATORIAL WEIGHING METHOD AND APPARATUS

[75] Inventor: Masao Fukuda, Shiga, Japan

[73] Assignee: Kabushiki Kaisha Ishida Koki Seisakusho, Kyoto, Japan

[21] Appl. No.: 394,926

[22] PCT Filed: Nov. 4, 1981

[86] PCT No.: PCT/JP81/00319
 § 371 Date: Jun. 25, 1982
 § 102(e) Date: Jun. 25, 1982

[87] PCT Pub. No.: WO82/01769
 PCT Pub. Date: May 27, 1982

[51] Int. Cl.³ .................. G01G 9/00; G01G 19/32; G01G 13/00
[52] U.S. Cl. ........................... 177/1; 177/25; 177/52
[58] Field of Search .......... 177/1, 25, 59, 52, 53, 177/54, 55, 56, DIG. 12

[56] References Cited

U.S. PATENT DOCUMENTS

| | | | |
|---|---|---|---|
| 3,939,928 | 2/1976 | Murakami et al. | 177/25 |
| 4,385,670 | 5/1983 | Braun et al. | 177/1 |
| 4,385,671 | 5/1983 | Hirano | 177/25 |
| 4,396,078 | 8/1983 | Minamida et al. | 177/1 |

Primary Examiner—E. A. Goldberg
Assistant Examiner—Patrick W. Foster
Attorney, Agent, or Firm—Armstrong, Nikaido, Marmelstein & Kubovcik

[57] ABSTRACT

A combinatorial weighing method and apparatus which operates by weighing plural groups of articles of various weighs by a plurality of weighing machines, finding the sums of all conceivable combinations of these weight values or of given combinations thereof, selecting the combination whose sum is equal to closest to a set value, and discharging the articles from those weighing machines corresponding to the selected combination to obtain articles of a desired weight or number. Between the discharge of the articles from the weighing machines and the following supply of fresh articles to the same weighing machines, an operation of determining the best combination by performing the same combinatorial computations with respect to the weight values of the remaining weighing machines which have not discharged their articles, is performed two or more times to improve weighing capability.

6 Claims, 16 Drawing Figures

FIG. 14

| Pulses \ Code No. | X1 | X2 | X3 | X4 | X5 | X6 | X7 | X8 | X9 | X10 | X11 | X12 |
|---|---|---|---|---|---|---|---|---|---|---|---|---|
| 1 | O | | | | | | | | | | | |
| 2 | | O | | | | | | | | | | |
| 3 | O | O | | | | | | | | | | |
| 4 | | | O | | | | | | | | | |
| 5 | O | | O | | | | | | | | | |
| 6 | | O | O | | | | | | | | | |
| 7 | O | O | O | | | | | | | | | |
| 8 | | | | O | | | | | | | | |
| 9 | O | | | O | | | | | | | | |
| 10 | | O | | O | | | | | | | | |
| 11 | O | O | | O | | | | | | | | |
| 12 | | | O | O | | | | | | | | |
| 13 | O | | O | O | | | | | | | | |
| 14 | | O | O | O | | | | | | | | |
| 15 | O | O | O | O | | | | | | | | |
| 16 | | | | | O | | | | | | | |
| 17 | O | | | | O | | | | | | | |
| 18 | | O | | | O | | | | | | | |
| 19 | O | O | | | O | | | | | | | |
| 20 | | | O | | O | | | | | | | |
| ⋮ | | | | | | | | | | | | |
| 2045 | O | | O | O | O | O | O | O | O | O | O | |
| 2046 | | O | O | O | O | O | O | O | O | O | O | |
| 2047 | O | O | O | O | O | O | O | O | O | O | O | |
| 2048 | | | | | | | | | | | | O |
| 2049 | O | | | | | | | | | | | O |
| 2050 | | O | | | | | | | | | | O |
| 2051 | O | O | | | | | | | | | | O |
| ⋮ | | | | | | | | | | | | |
| 4091 | O | O | | O | O | O | O | O | O | O | O | O |
| 4092 | | | O | O | O | O | O | O | O | O | O | O |
| 4093 | O | | O | O | O | O | O | O | O | O | O | O |
| 4094 | | O | O | O | O | O | O | O | O | O | O | O |
| 4095 | O | O | O | O | O | O | O | O | O | O | O | O |

4,491,189

COMBINATORIAL WEIGHING METHOD AND APPARATUS

This invention relates to a combinatorial weighing method and apparatus for weighing out articles having unit weights that differ greatly from one to another, such as vegetables and fruits, perishables, fabricated articles and confectioneries, into fixed weights with great accuracy and high efficiency.

The Applicant has already disclosed, in Japanese Patent Publication Nos. 14946/79 and 48249/80, a weighing method of measuring the weights of articles delivered to the weighing hoppers of a plurality of weighing machines, taking the sum of every combination of different weight values, and obtaining the combination of weights which is equal or closest to a predetermined weight, as well as a counting method of dividing each of the abovementioned weight values by the unit weight of each article to convert each weight value into a value representing the number of articles, taking the sum of every combination of different article number values, and obtaining a predetermined number of the articles.

The methods of the above type for providing predetermined weights or a predetermined number of articles by combinatorial computations are advantageous in that weighing accuracy is not influenced by disparities in the unit weights of the articles, enabling highly precise weighing operations to be carried out, and in that any disorder in the feed or distribution of the articles does not lead directly to overweights or errors, so that great accuracy can be maintained even for large set values. In addition, errors attributed to the setting of the individual weighing machines have no influence upon final error.

Thus, the major feature of combinatorial weighing is its great accuracy. Aside from this feature, however, there has recently been a demand for improved weighing capability.

The present invention has been developed in view of the foregoing circumstances and provides a combinatorial method and apparatus for discharging from weighing hoppers weighed articles corresponding to a best combination, which is that value equal or closest to a set target value, providing said weighing hoppers with a fresh supply of the articles-to-be-weighed, finding the best combination, which is that equal or closest to the set value, from the values of the articles presently remaining in the weighing hoppers, said operation of finding the best combination being performed a predetermined number of times before a condition is attained wherein the values of the articles-to-be-weighed supplied to said weighing hoppers can participate again in a combinatorial computation, and discharging from the weighing hoppers the weighed articles corresponding to the best combination found by each performance of a combinatorial computation, whereby weighing capability is greatly improved.

The combinatorial weighing method and apparatus of the present invention execute out high-speed weighing and improve weighing capability by discharging from weighing hoppers the weighed articles corresponding to the best combination, providing the emptied weighing hoppers, following the discharge operation, with a fresh supply of the articles-to-be-weighed, finding the best combination, which is that value equal or closest to the set value, from the values of the articles presently remaining in the weighing hoppers, said operation of finding the best combination being performed a predetermined number of times before the values of the articles-to-be-weighed supplied to said weighing hoppers can participate again in a combinatorial computation, and successively discharging from the weighing hoppers the weighed articles corresponding to the best combination found by each performance of a combinatorial computation.

Further, the present invention makes the most of the advantages found in the conventional combinatorial weighing operation. Namely, disparities in unit weight have no direct influence upon weighing accuracy, enabling highly precise weighing operations to be carried out. Any disorder in the feed or distribution of the articles does not lead directly to overweight errors, so that great accuracy can be maintained even for large set values. Since the actual weight values of each weighing machine are combined, errors atrributable to the setting of the individual weighing machines have no influence upon final error. The invention is well suited for assorting or packing articles, which differ in unit weight or in weight per unit in each bag or packet, into lots of a predetermined weight or composed of a predetermined number of articles. The error curve is ideal since the area about the zero point thereof is extremely large. In addition, articles which do not participate in the best combination are not processed but remain to take part in the next combinatorial computation. These articles therefore are not damaged.

Another advantageous effect is that articles corresponding to the best combination which are discharged from the weighing hoppers can be collected in reliable fashion each time a combinatorial computation is carried out. It is therefore easy to realize a combinatorial weighing apparatus which weighs at high speed. Moreover, if use is made of a plurality of conveyors for collecting the articles, then the overall length of the conveyor itself can be shortened and the articles discharged from the weighing conveyors can be collected at a higher efficiency. This in turn also has the advantageous effect of facilitating the working of a combinatorial weighing apparatus for high-speed weighing.

These and other objects and features of the present invention will become apparent from a reading of the following description with reference to the accompanying drawings illustrating a preferred embodiment of the invention, in which:

FIG. 14 is a diagram showing combination patterns of code numbers assigned to respective weighing machines or weighing hoppers;

FIG. 16 is a flow chart illustrating an example of a program when software is processed through use of a microcomputer, microprocessor or the like.

Figure 1:
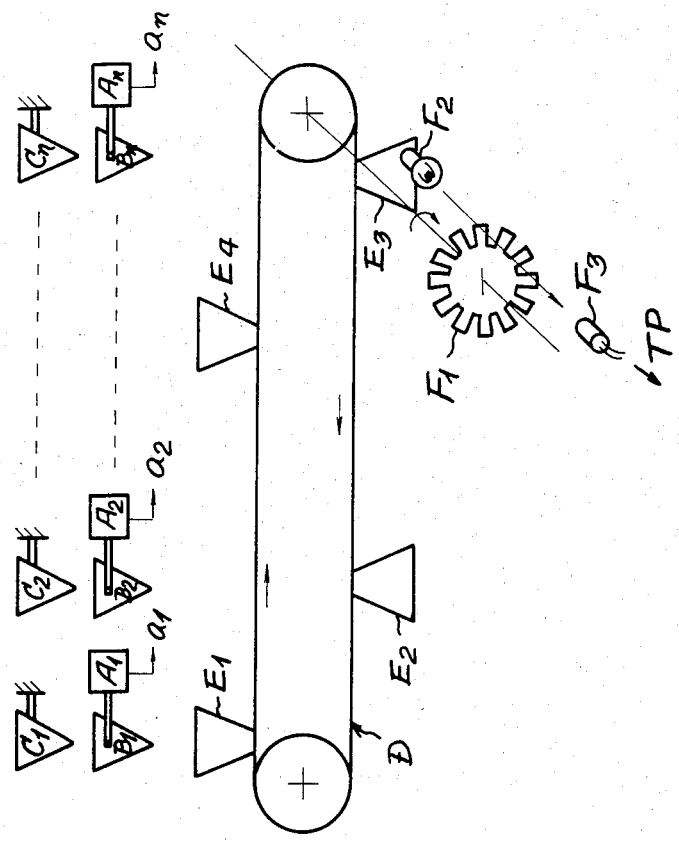
FIG. 1 is a simplified structural view of a mechanism for weighing and collecting articles.

FIG. 1 is a simplified structural view illustrating an example of the collecting mechanism of a weighing machine employed in the present invention. In the Figure, $A_1, A_2, \ldots, A_n$ denotes weighing machines, $B_1, B_2, \ldots, B_n$ denote the weighing hoppers of the weighing machines, $C_1, C_2, \ldots C_n$ represent pool hoppers, and D designates a conveyor, operatively coupled to a packing machine or the like, equipped with a plurality of buckets $E_1, E_2, \ldots E_n$. Further, F denotes a discharge timing pulse generator having a slit plate $F_1$ which rotates in sync with the conveyor D, a light projector $F_2$, and a light receiver $F_3$.

Each pool hopper is provided with an independent article feeder (not shown). The feeders and weighing mechanism which can be used are of the well-known conventional type. That is, when a pool hopper is emptied by completely discharging its articles, the feeder corresponding to that hopper is started to supply the hopper with a single article or a set number of articles, or with articles of an approximately set weight, after which the feeder stops operating. When a weighing hopper is emptied by completely discharging is articles, the pool hopper corresponding to that weighing hopper is opened and closed to discharge its articles into the weighing hopper.

The arrangement is such that buckets $E_1, E_2 \ldots E_n$ travel continuously and successively collect the articles discharged from the weighing hoppers in sync with discharge timing pulses TP generated by the discharge timing pulse generator F.

It is so arranged that the weighing machines $A_1, A_2 \ldots A_n$ can apply the weight values of the articles in the weighing hoppers corresponding thereto, to an electronic computing circuit of the present invention in a manner described below. Let $a_1, a_2 \ldots a_n$ designate weight values signals produced by the weighing machines $A_1, A_2 \ldots A_n$.

Figure 2:
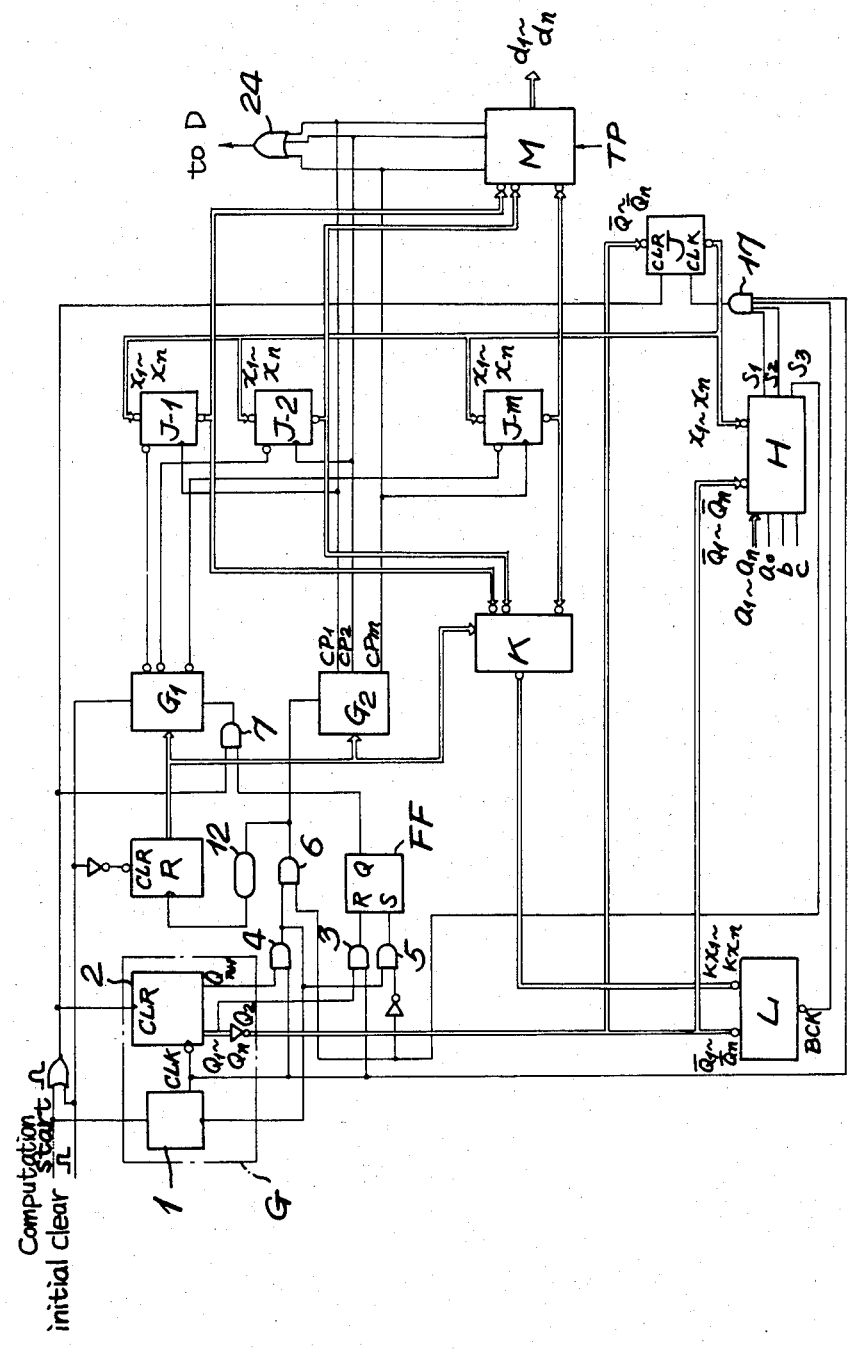
FIG. 2 is a block wiring diagram of an electronic computing circuit.

FIG. 2 is a block diagram illustrating the above-mentioned electronic computing circuit of the present invention. In the Figure, G represents an addition code selecting circuit which selects addition code combinations for selectively adding the weight value signals $a_1, a_2 \ldots a_n$ produced by the respective weighing machines $A_1, A_2 \ldots A_n$. Character H represents an adding comparison circuit for selectively adding the weight signals on the basis of the addition code from the addition code selecting circuit G, for comparing the resulting sum $\alpha$ with a set weight value $a_o$, for adding the weight values on the basis of a best addition code stored in an addition code storage circuit J, to be described below, and for comparing the resulting sum $\beta$ with the sum $\alpha$, a lower limit setting b, and an upper limit setting c.

Character J denotes an addition code storage circuit for storing the combination code of a value closest to a desired set weight value, in accordance with the results of the comparison operations performed by the adding comparison circuit H, and the result of a checking operation performed by a bit checking circuit L, which will be described later. J-1, J-2, ... J-m denote first, second, ... m-th addition code storage circuits which, after all combinations of the addition codes are computed, store the best addition code contained in the addition code storage circuit J, in response to storage command pulses CP produced by a storage command signal generating circuit $G_2$, described below. As to the number of these addition code storage circuits, weighing hoppers discharge their articles and then are supplied with articles afresh. Before the weight values of these articles supplied to said weighing hoppers again take part in a combinatorial computation, a predetermined number of combinatorial computations are performed on the basis of the weight values of those articles remaining in the weighing hoppers. Thus the number of addition code storage circuits J-1, J-2 ... J-m is such as to permit the storage of all the best addition codes corresponding to the best combinations obtained from each of the above combinatory computations, as well as the best addition code corresponding to the weighing hoppers which have just discharged their articles.

The number of combinatorial computations performed from the discharge operation until these weighing hoppers participate in the next combinatorial computation, is decided by the number of weighing hoppers, the number of weighing hoppers that execute a discharge operation based on the result of a single combinatorial computation, and the collecting capacity of a collection mechanism which accumulates the articles discharged from the weighing hoppers.

Character L represents a bit checking circuit for checking the bits in an addition code combination from the addition code selecting circuit G, and in the best combination codes, sorted in the first, second ... m-th addition code storage circuits J-1, J-2 ... J-m, that are received through a selected pattern register K. Character R represents a decoder counter which, at the end of all combinations of addition codes, delivers a control signal to the selected pattern register K, as well as to a preset signal generating circuit $G_1$ and storage command signal generating circuit $G_2$, described below.

$G_1$ denotes the preset signal generating circuit, which is adapted to deliver a preset signal by any one of the first, second, ..., m-th addition code storage circuits J-1, J-2 ... J-m. $G_2$ denotes the storage command signal generating circuit, which is adapted to deliver a storage command signal to any one of the first, second ... m-th addition code storage circuits J-1, J-2 ... J-m.

Character FF represents a flip-flop. In a case where all combinations of addition codes have been computed and there is no best addition code, the flip-flop FF presets one of the first, second ... m-th addition code storage circuits J-1, J-2 ... J-m through the preset signal generating circuit $G_1$.

Character M represents a discharge control circuit which, through a computation completion signal when all combinations of addition codes have been computed, reads out the best addition code from one of the first, second ... m-th addition code storage circuits J-1, J-2 .

... J-m, and sends discharge signals $d_1, d_2 \ldots d_n$ to the corresponding weighing hoppers.

A code number is assigned to each weighing machine, or to each weighing hopper. The addition code mentioned above refers to the particular combination of these code numbers. If we let the code numbers of respective weighing machines be denoted by $X_1, X_2 \ldots X_n$, then the total number of combinations will be n when each combination is composed of one code number extracted from the n-number of code numbers. The number of combinations will be $n(n-1)/2 \times 1$ when each combination is composed of two code numbers extracted from the n-number of code numbers. The number of combinations will be $$\frac{n(n-1)(n-2)\ldots(n-r+1)}{r!}$$

when each combination is composed of r code numbers extracted from the n-number of code numbers. Any one of these combinations is delivered by the addition code selecting circuit G of the electronic computing circuit.

The specific construction of the abovementioned circuits constituting the electronic computing circuit will be described next. All of the diagrams which illustrate the specific circuit arrangements are for a case where 12 of the weighing machines are employed.

Figure 3:
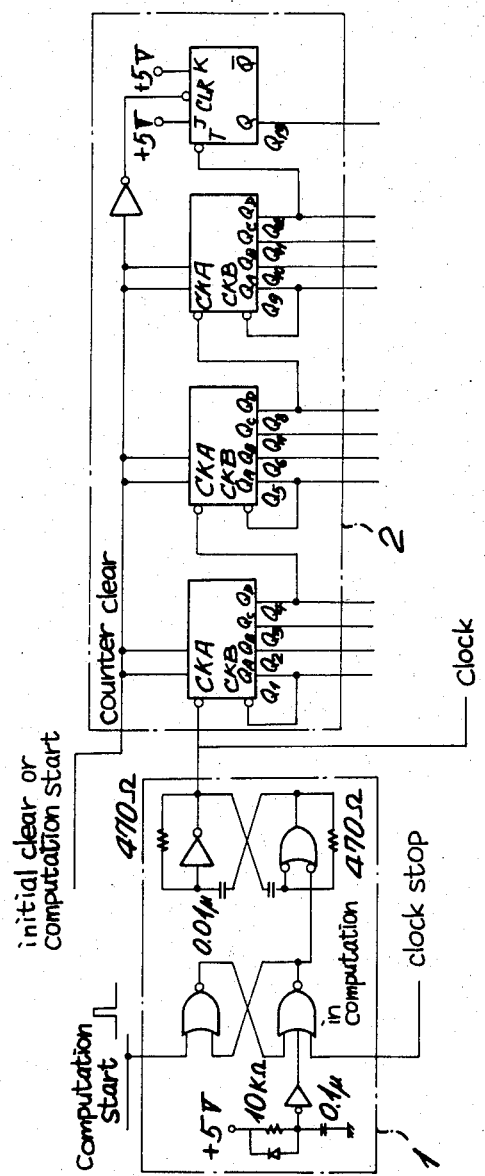
FIG. 3 is a diagram of an addition code selecting circuit in the electronic computing circuit of FIG. 2.

As shown in FIG. 3, the addition code selecting circuit G is constituted by a clock pulse generator 1 for generating clock pulses in response to a computation start pulse, and a 13-bit counter 2, consisting of four serially connected binary counter stages, which receives the clock pulse output. The addition code selecting circuit G generates the combination patterns shown in FIG. 13, in which the bit outputs of the counter 2 change each time a clock pulse is produced by the clock pulse generator 1. If the bit outputs $Q_1, Q_2 \ldots Q_n$ of counter 2 are made to correspond to the code numbers $X_1, X_2 \ldots X_n$ of the respective weighing machines $A_1, A_2 \ldots A_n$, then the combination patterns will be as shown in FIG. 14, the total number of combinations being 4095 in a case where there are 12 weighing machines. Outputs $\overline{Q}_1, \overline{Q}_2 \ldots \overline{Q}_n$, which are the inversions of the bit outputs $Q_1, Q_2 \ldots Q_n$ of counter 2, are connected to the addition code storage circuit J, the adding comparison circuit H, and the bit checking circuit L.

As shown in FIG. 2, the output of clock pulse generator 1 and the second bit output $Q_2$ of counter 2 are connected to the input side of an AND gate 3, the output of the clock pulse generator 1 and the (n+1)-th bit output $Q_{n+1}$ of counter 2 are connected to the input side of an AND gate 4, and the output from the AND gate 4 is connected as a computation completion signal to the clock pulse generator 1 and to input sides of AND gates 5, 6 which receive a check signal $S_3$, described below, from the adding coincidence circuit H, which signal $S_3$ is for checking allowable error limits. The outputs of AND gates 3, 5 are connected respectively to the R and S terminals of the flip-flop FF, as shown in FIG. 2. The Q output of the flip-flop FF is applied to an AND gate 7.

Figure 4:
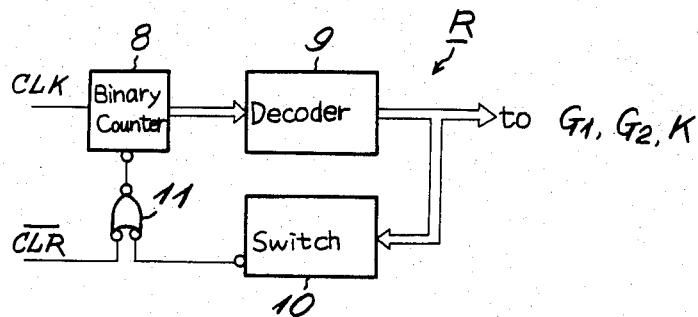
FIG. 4 is a circuit diagram of a decoder counter in the electronic computing circuit of FIG. 2.

The decoder counter R, as depicted in FIG. 4, comprises a binary counter 8, a decoder 9, an overlap number modification switch 10, and an OR gate 11 for delivering a clear signal to the binary counter 8. When a clear signal CLR enters the binary counter 8, only the first bit becomes a "1", when the next clock signal CLK enters, only the second bit becomes a "1", and so on. Thus the binary counter is shifted successively with the clock signals CLK, the original state being restored after m steps. The decoder outputs of the decoder counter R are applied to the preset signal generating circuit $G_1$, the storage command signal generating circuit $G_2$, and the selected pattern register K. The output of AND gate 6 is applied to the clock terminal CLK of the binary counter 8 through a delay circuit 12.

Figure 5:
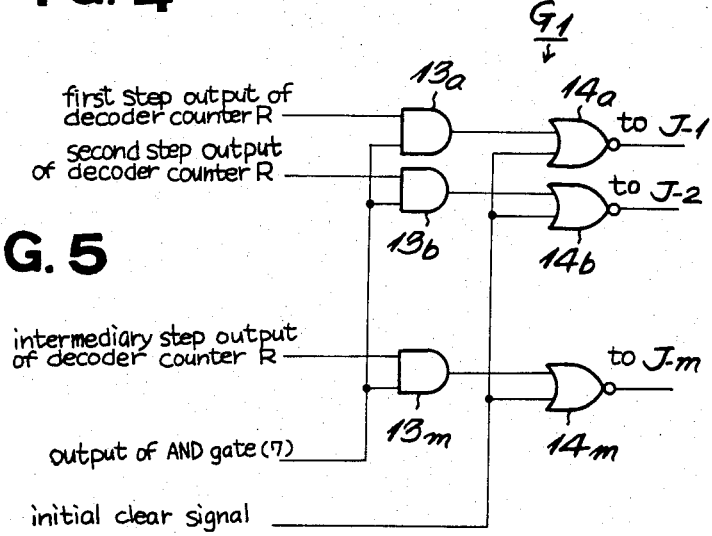
FIG. 5 is a diagram of a preset signal generating circuit in the electronic computing circuit of FIG. 2.

As shown in FIG. 5, the preset signal generating circuit $G_1$ is constituted by m-number of AND gates $13a, 13b \ldots 13m$ and m-number of NOR gates $14a, 14b \ldots 14m$. The decoder output of the decoder counter R is applied to one input terminal of each of the AND gates 13. The other input terminals receive the output of the AND gate 7. The outputs of the AND gates 13 are applied to the NOR gates 14 at one input terminal thereof. The other input terminals receive an initial clear signal. The outputs of these m-number of NOR gates $14a, 14b \ldots 14m$ are applied to preset terminals PR on the first, second ... m-th addition code storage circuits J-1, J-2 ... J-m, respectively.

Figure 6:
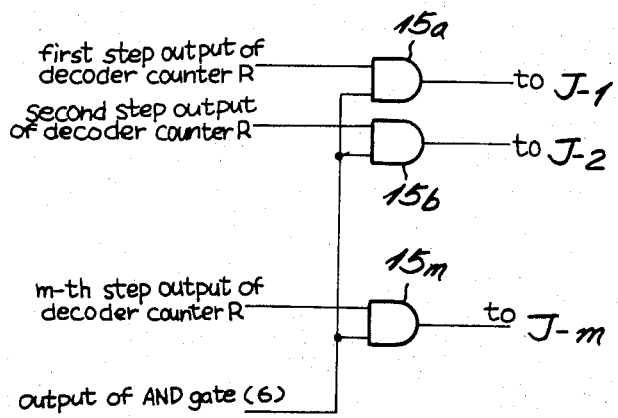
FIG. 6 is a diagram of a storage command signal generating circuit in the electronic computing circuit of FIG. 2.

As shown in FIG. 6, the storage command signal generating circuit $G_2$ comprises m-number of AND gates $15a, 15b \ldots 15m$. The decoder outputs of the decoder counter R are applied to the AND gates 15 at one input terminal thereof. The other input terminals receive the output of AND gate 6. The outputs of the m-number of AND gates $15a, 15b \ldots 15m$ are applied to the clock input terminals CLK of the first, second ... m-th addition code storage circuits J-1, J-2 ... J-m, respectively, and to the discharge control circuit M and an OR gate 24.

Figure 7:
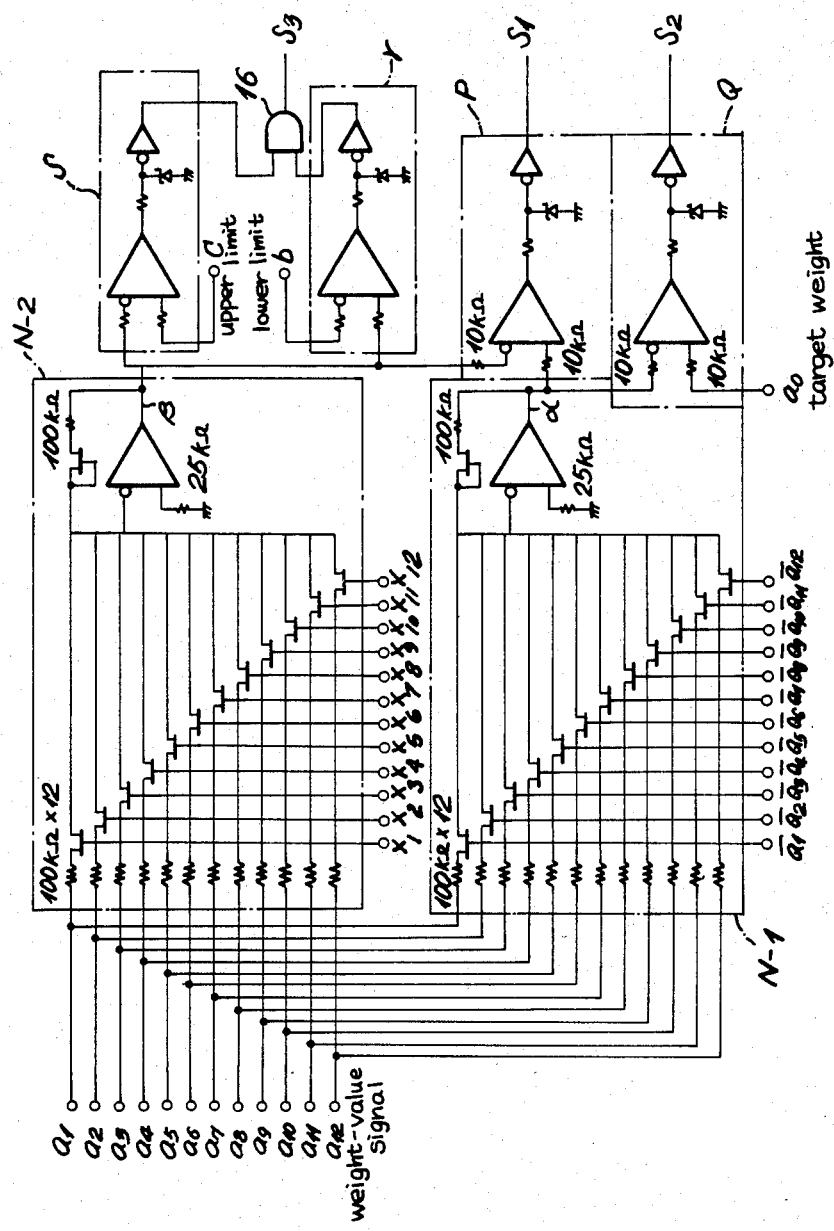
FIG. 7 is a diagram of an adding comparison circuit in the electronic computing circuit of FIG. 2.

As shown in FIG. 7, the adding comparison circuit H is constituted by a first adder N-1, which receives the weight value signals $a_1, a_2 \ldots a_n$ and the inverted outputs $\overline{Q}_1, \overline{Q}_2 \ldots \overline{Q}_n$ of the addition code selecting circuit G, for adding the weight values signals on the basis of the combination pattern (FIG. 14) from the addition code selecting circuit G, a second adder N-2, which receives the weight values $a_1, a_2 \ldots a_n$ and the best combination code outputs $x_1, x_2 \ldots x_n$ from the addition code storage circuit J, for adding the weight value signals on the basis of the combination code, a sum comparator P for comparing the outputs $\alpha, \beta$ of the adders N-1, N-2, a weight value comparator Q for comparing the output $\alpha$ of the first adder N-1 and the set weight value $a_o$, as well as a lower limit setting comparator r and an upper limit set value comparator s for comparing the output $\beta$ of the second adder N-2 with a lower limit setting b and an upper limit setting c, respectively.

The output $S_1$ of the sum comparator P is a "1" when the output $\alpha$ of the first adder N-1 is smaller than the output $\beta$ of the second adder N-2, namely when $\alpha < \beta$, and is a "0" in cases other than $\alpha < \beta$, namely when $\alpha \geq \beta$. The output $S_2$ of the weight comparator Q is a "1" when the output $\alpha$ of the first adder N-1 is greater than or equal to the set weight value $a_o$, namely when $\alpha \geq a_o$, and is a "0" when $\alpha < a_o$, whereby minus weighing is prohibited. The output $S_3$ of an AND gate 16, whose inputs are the output signals from the comparators r, s, is a "1" when the output $\beta$ of the second adder N-2 is greater than or equal to the lower limit setting b, and equal to or less than the upper limit setting c, namely when the output $\beta$ is within the allowable error limits ($b \leq \beta \leq c$). The output $S_3$ is a "0" when $\beta$ is outside the allowable error limits ($\beta < b$ or $\beta > c$). In consideration of the fact that the weighing hoppers oscillate somewhat, the lower limit setting b is chosen to be slightly smaller the set weight value $a_o$ in order to relax the allowable error limits.

The output $S_1$ of the sum comparator P, the output $S_2$ of the weight comparator Q, the output of the clock pulse generator 1, and the output BCK of the bit checking circuit L, described below, are connected to the input side of an AND gate 17. The allowable error limit check signal $S_3$ is connected to the input sides of AND gates 5, 6, as described above. (See FIG. 2.)

Figure 8:
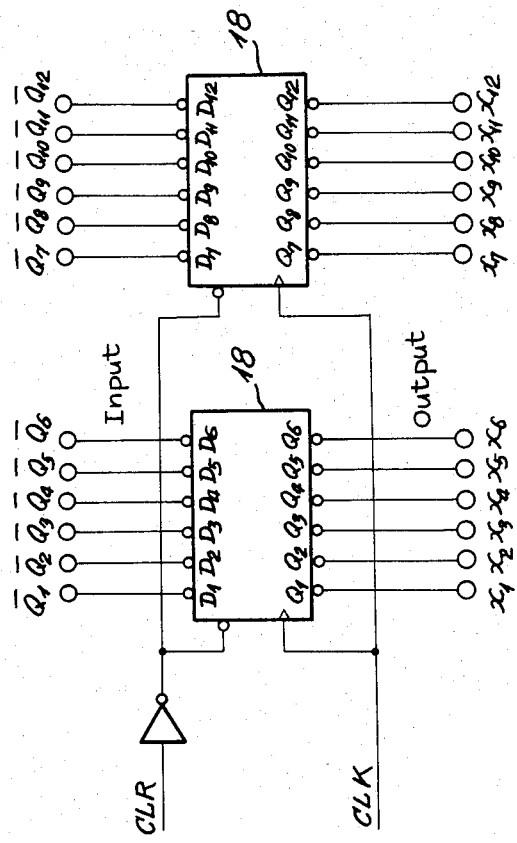
FIG. 8 is a diagram of an addition code storage circuit in the electronic computing circuit of FIG. 2.

The addition code storage circuit J is for the purpose of storing the code of the combination of values closest to the set weight value $a_o$, namely the desired set weight. As shown in FIG. 8 the addition code storage circuit J is constituted by a predetermined number of six-bit registers 18 (two registers when there are 12 weighing machines). The inverted output $\overline{Q}_1, \overline{Q}_2 \ldots \overline{Q}_n$ of the addition code selecting circuit G are connected to the input side of the addition code storage circuit J. The output side is connected to the second adder N-2 of the adding comparison circuit H and to each of the first, second ... m-th addition code storage circuits J-1, J-2 ... J-m. The arrangement is such that the outputs $x_1, x_2 \ldots x_n$ correspond to the inputs $\overline{Q}_1, \overline{Q}_2 \ldots \overline{Q}_n$, that is, to the code numbers $X_1, X_2 \ldots X_n$ of the respective weighing machines. When the output of AND gate 17 (FIG. 2) is a "1", those of the inputs $\overline{Q}_1, \overline{Q}_2 \ldots \overline{Q}_n$ which are logical "1" are read in. In other words, the addition code storage circuit J stores the combination code selected by the addition code selecting circuit G and delivers the combination code.

The addition code storage circuit J has all its code outputs $x_1, x_2 \ldots x_n$ cleared to "1", and is thus placed in the full code selection state, in response to an initial clear pulse or computation start pulse.

Figure 9:
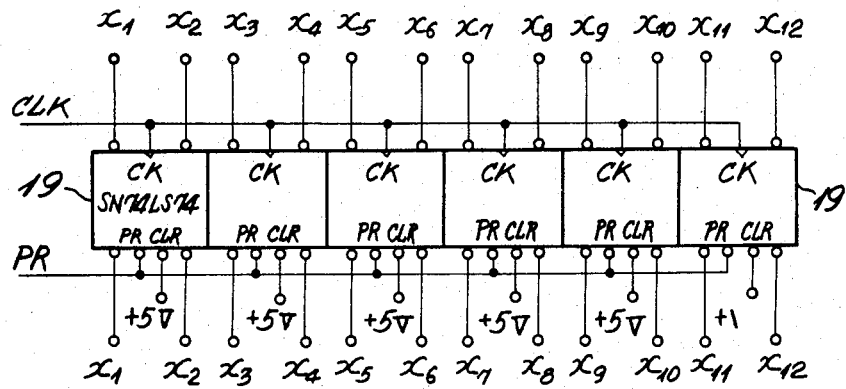
FIG. 9 is a diagram of first, second, ..., m-th addition code storage circuits in the electronic computing circuit of FIG. 2.

The first, second ... m-th addition code storage circuits J-1, J-2 ... J-m are structurally identical and, as shown in FIG. 9, comprise a predetermined number of two-bit registers 19, 19 .... The code outputs $x_1, x_2 \ldots x_n$ of the addition code storage circuit J are applied to the input side of each of the addition code storage circuits. The outputs of each storage circuit are applied to the selected pattern register K and to the discharge control circuit M. The best combination code contained in the addition code storage circuit J is stored in one of the first, second ... m-th addition code storage circuits J-1, J-2 ... J-m in response to whichever of the storage command pulses $CP_1, CP_2 \ldots CP_m$ is at logical "1", these pulses being produced by the storage command signal generating circuit $G_2$. Those outputs of the addition code storage circuits which correspond to the stored combination code go to logical "1".

Each addition code storage circuit J-1, J-2 ... J-m is preset by an initial clear pulse or by a "1" output from the preset signal generating circuit $G_1$, the outputs of the storage circuit going to "0", whereby it is placed in a state devoid of any storage combination code.

Figure 10:
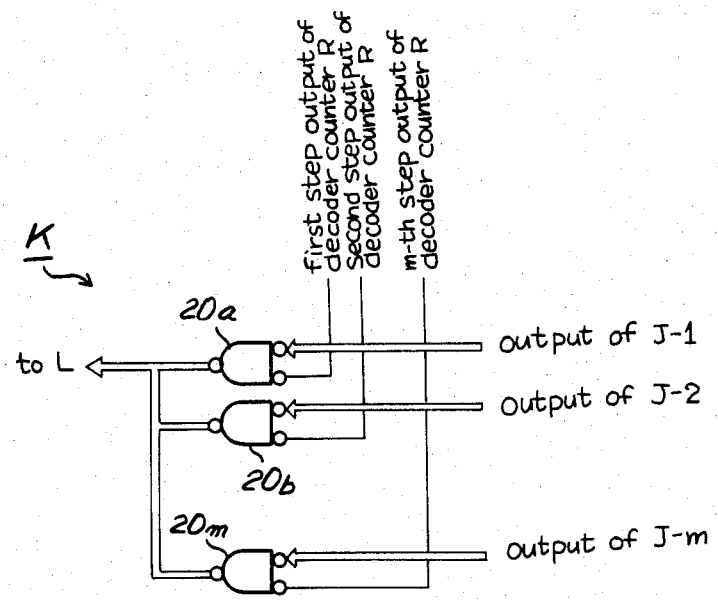
FIG. 10 is a circuit diagram of a selected pattern register in the electronic computing circuit of FIG. 2.

As shown in FIG. 10, the selected pattern register K is composed of m-number of wired open collector or tristate AND gates 20a, 20b ... 20m. One input terminal of each of the AND gates 20a, 20b ... 20m receives a decoder output from the decoder counter R. The other input terminal to each AND gate receives the outputs from a respective one of the first, second ... m-th addition code storage circuits J-1, J-2 ... J-m. The outputs of the AND gates 20a, 20b ... 20m are applied to the bit checking circuit L. Transmitted to the bit checking circuit is the entirety of the memory data of the addition code storage circuits, excluding that addition code storage circuit which is being selected by the decoder 9 of the decoder counter R.

Figure 11:
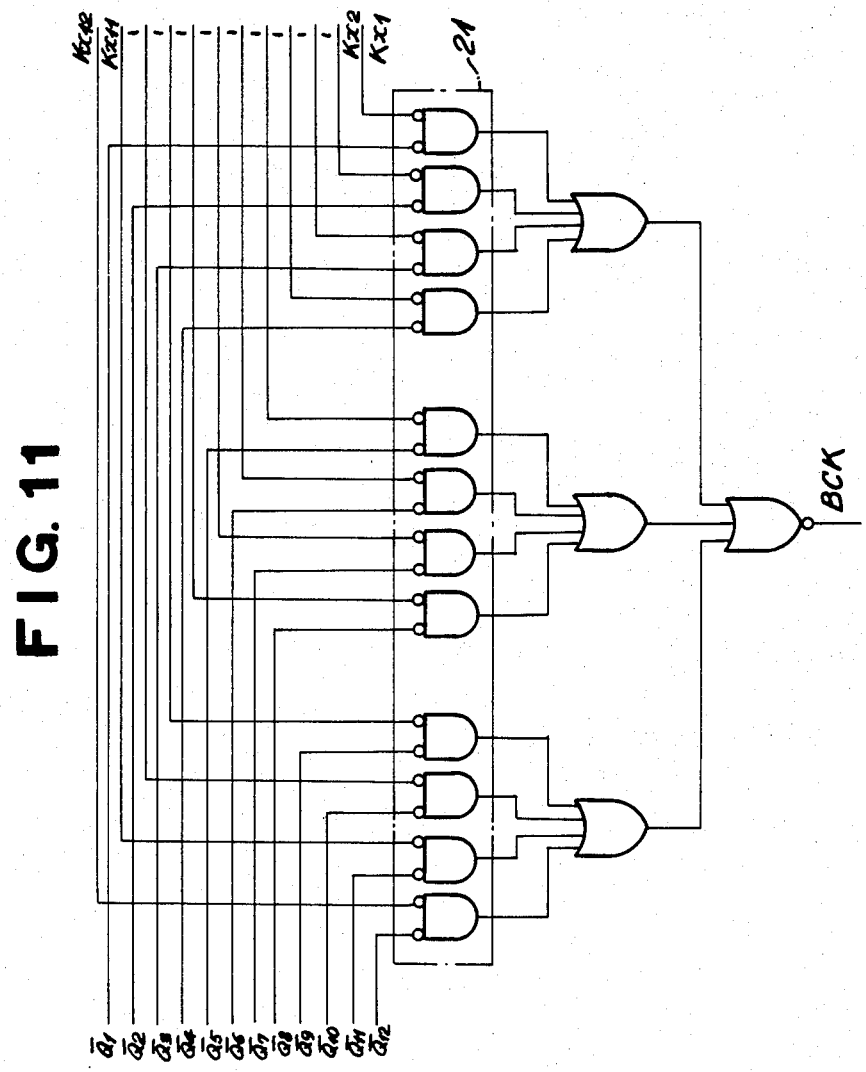
FIG. 11 is a bit checking circuit in the electronic computing circuit of FIG. 2.

The bit checking circuit L, having the circuit construction shown in FIG. 11, receives as inputs the inverted outputs $\overline{Q}_1, \overline{Q}_2 \ldots \overline{Q}_n$ of the addition code selecting circuit G as well as the code outputs $Kx_1, Kx_2 \ldots Kx_n$ of the selected pattern register K, and is adapted to check each of the bits $\overline{Q}_1$ and $Kx_1$, $\overline{Q}_2$ and $Kx_2 \ldots \overline{Q}_n$ and $Kx_n$ of both inputs by means of a logic circuit 21. If both inputs in any one of the sets $(\overline{Q}_1, Kx_1), (\overline{Q}_2, Kx_2) \ldots (\overline{Q}_n, Kx_n)$ coincide by going to logical "1" simultaneously, the output BCK of the bit check circuit L goes to logical "0". When none of the sets indicate coincidence, the output BCK goes to logical "1".

Figure 12:
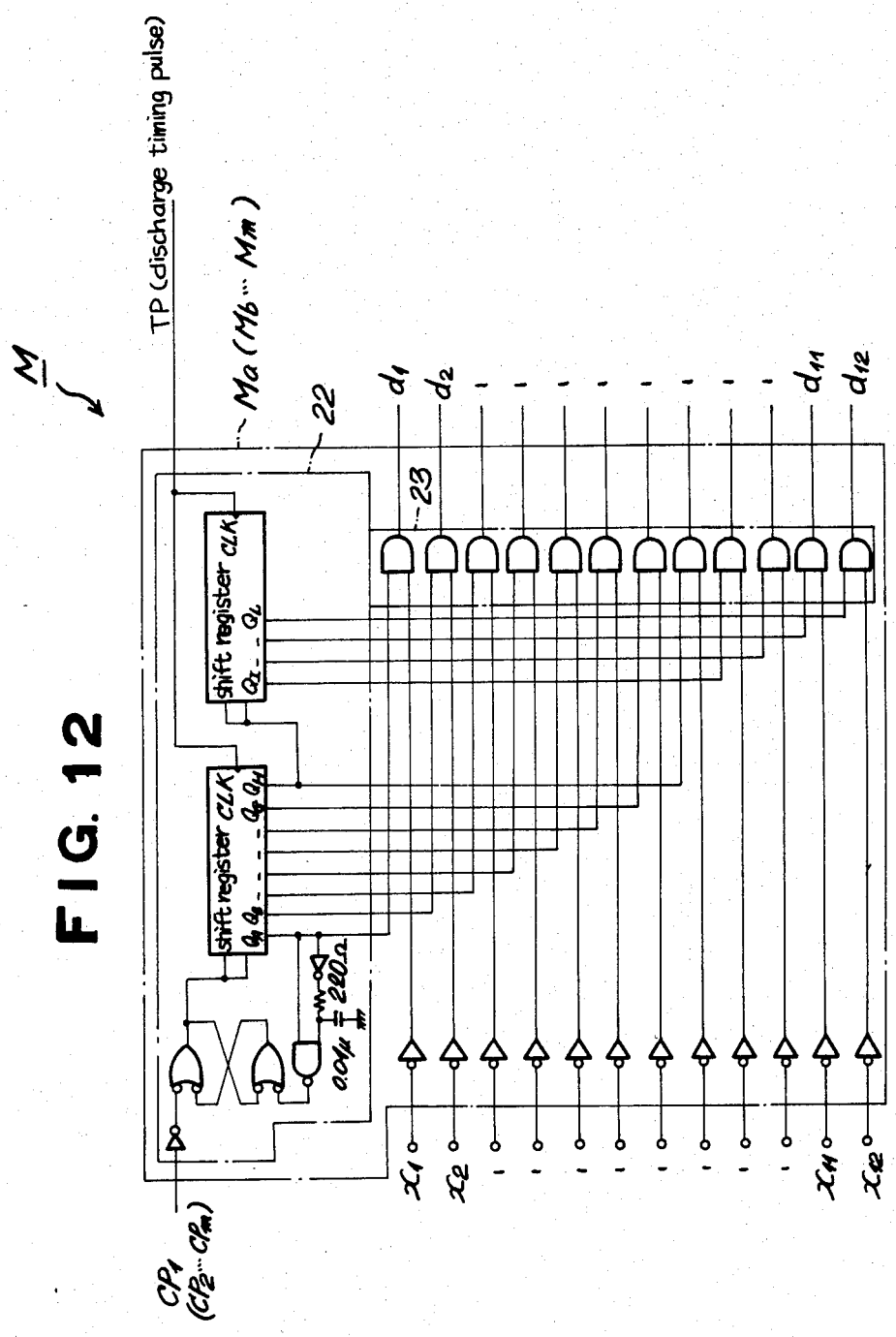
FIG. 12 is a diagram of a discharge control circuit in the electronic computing circuit of FIG. 2.

The discharge control circuit M, illustrated in FIG. 12, has m-number of control circuits $M_a$. The control circuits $M_a, M_b \ldots M_m$ correspond to the first, second ... m-th addition code storage circuits J-1, J-2 ... J-m, respectively. Each of the m-number of control circuits $M_a, M_b \ldots M_m$ is constituted by a pulse generating circuit 22 which receives an output from the storage command signal generating circuit $G_2$ shown in FIG. 2 as well as the discharge timing pulses TP from the discharge timing pulse generator F and which, upon receiving a "1" output from the storage command signal generating circuit $G_2$, successively produces pulses serially in time from the outputs $Q_A, Q_B \ldots$ each time a timing pulse TP arrives, and by a logic circuit 23 which receives the outputs $Q_A, Q_B \ldots$ of circuit 22, as well as the code outputs $x_1, x_2 \ldots x_n$ from the corresponding addition code storage circuit in the first, second ... m-th addition code storage circuits J-1, J-2 ... J-m. The logic circuit 23 takes the AND of $Q_A$ and $x_1$, $Q_B$ and $x_2 \ldots$; when both inputs are at logical "1", a discharge signal $d_1, d_2 \ldots d_n$ is produced and sent to the corresponding weighing machine.

It should be noted that the discharge signals $d_1, d_2 \ldots d_n$ produced by the logic circuit 23 in each of the control circuits $M_a, M_b \ldots M_m$ are delivered through an OR gate.

Next, the operation of the apparatus of the present invention having the above-described construction will be described for a case where a value closest to the set weight values $a_o$ is obtained through use of 12 weighing machines.

Initially, the power source is turned on to generate an initial clear pulse automatically or manually following the closure of a special purpose switch. This clears each of the outputs $Q_1, Q_2 \ldots Q_{13}$ from counter 2 of the addition code selecting circuit G to "0", and clears each output $x_1, x_2 \ldots x_{12}$ of the addition code storage circuit J to "1", placing the storage circuit in the full code selection state. At the same time, decoder counter R is raised to logical "1" for the first bit only, with the second through m-th bits being logical "0", and flip-flop FF has its Q output cleared to "0" (the connection diagram is not shown). The code outputs $x_1, x_2 \ldots x_{12}$ of the first, second ... m-th addition code storage circuits J-1, J-2 ... J-m also are preset to "0", so that each of these storage circuits is placed in a state devoid of a stored combination code. Each output of the storage command signal generating circuit $G_2$ goes to logical "0", as does the output of OR gate 24; the conveyor D, therefore, will not run. In short, since the discharge timing pulses TP are not produced, pulses do not issue from the outputs $Q_A, Q_B \ldots Q_L$ of any of the pulse generating circuits 22 in discharge control circuit M. The discharge signals $d_1, d_2 \ldots d_{12}$ therefore are not produced. Since the first bit of decoder counter R is a "1", moreover, the selected pattern register K applies each "0" output of the second, third . . . m-th addition code storage circuits J-2, J-3 . . . J-m to the bit checking circuit L. Since the inputs to the bit checking circuit L from the addition code selecting circuit G are all "0", the two sets of inputs do not coincide, so that the output BCK from the bit checking circuit L is a "1". Of the inputs to the adding comparison circuit H, each input $\overline{Q}_1, \overline{Q}_2 \ldots \overline{Q}_{12}$ from the addition code selecting circuit G is logical "0", and each code input $x_1, x_2 \ldots x_{12}$ from the addition code storage circuit J is logical "1". Since the weight value signals $a_1, a_2 \ldots a_{12}$ are a magnitude zero at this time, the output of the first adder N-1 is $\alpha = 0$, and the output of the second adder N-2 is $\beta = 0$. As a result, the output $S_1$ of sum comparator P is "0", as is the output $S_2$ of weight value comparator Q. Further, "0" also is the logical value of the output $S_3$ from AND gate 16, whose inputs are the outputs from the upper limit setting comparator s and from the lower limit setting comparator r. Consequently, the output of AND gate 17 is logical "0", so that the addition code storage circuit J remains in the full code selection state. Also, since the output $S_3$ of AND gate 16 is logical "0" as mentioned above, one input to AND gate 5 is logical "1", while the other input is logical "0" owing to the "0" output of AND gate 4. The output of AND gate 5 therefore is logical "0", so that the Q output of flip-flop FF remains cleared to "0".

Figure 13:
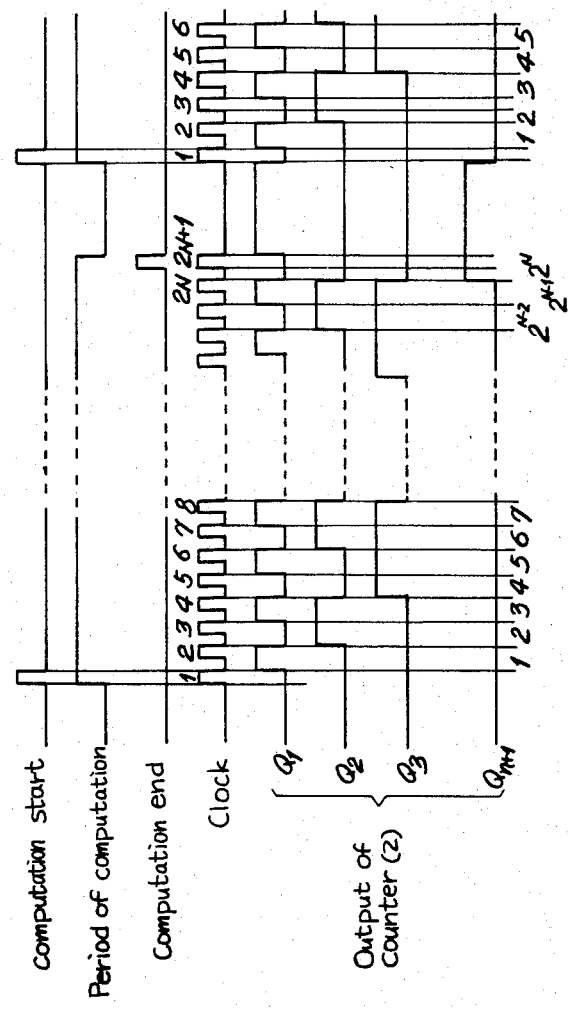
FIG. 13 is a waveform diagram of outputs from the addition code selecting circuit in the electronic computing circuit of FIG. 2.

Next, articles are charged into each of the weighing hoppers $B_1, B_2 \ldots B_{12}$ of the weighing machines $A_1, A_2 \ldots A_{12}$ from the respective pool hoppers $C_1, C_2 \ldots C_{12}$, and the articles are weighed. Upon completion of the weighing operation, a computation start signal is applied to the electronic computing circuit of FIG. 2 in response to a weighing completion signal or a signal from a packing machine. The computation start signal is applied as a clear signal to the counter 2 of the addition code selecting circuit G and to the addition code storage circuit J, though these have already been cleared by the initial clear pulse, as described above. Although AND gate 7 also receives the computation start signal, its output remains at logical "0" owing to the fact that the Q output of flip-flop FF has been cleared to "0". When the computation start signal enters the clock pulse generator 1 of the addition code selecting circuit G, clock pulses are fed to the counter 2 which generates combination patterns, namely addition combination codes from its outputs $Q_1, Q_2 \ldots Q_{12}$, as shown in FIG. 13.

Now, with $X_1, X_2 \ldots X_{12}$ being the code numbers of the respective weighing machines $A_1, A_2 \ldots A_{12}$ and with the respective weight values being designated $a_1, a_2 \ldots a_{12}$, the addition combination codes produced by the counter 2 will be $X_1, X_2, X_1 + X_2$ and so on, with the addition comparison circuit H performing these computations in the mentioned order. First, for $X_1$, and referring to FIG. 7, the sum $\alpha$ of the first adder N-1 is $\alpha = a_1$. Since the addition code storage circuit J has been placed in the full code selection state, the sum $\beta$ of the second adder N-2 is $\beta = a_1 + a_2 \ldots a_{12}$. The sum comparator P compares $\alpha$ and $\beta$, the output $S_1$ of comparator P going to logical "1" since $\alpha < \beta$. If the weighing limit of each weighing machine is so selected at to give the set weight value $a_o$ by combining a plurality, say two to four, of the weight values, then the result of comparing $\alpha$ and $a_o$ by means of the weight comparator Q will be $\alpha < a_o$, so that the output $S_2$ of the comparator will be logical "0". Furthermore, the result of the comparison performed by the lower limit setting comparator r will be $b < \beta$, and the result of the comparison performed by the upper limit comparators S will be $c < \beta$, whereby the output $S_3$ of AND gate 16 goes to logical "0", which is the result of checking the allowable error limits in connection with the set weight value $a_o$.

As to the inputs to the bit checking circuit L from the counter 2 of addition code selecting circuit G, $\overline{Q}_1$ is "1" and $Q_2 \ldots Q_{12}$ are each "0". Further, the code outputs $Kx_1, Kx_2 \ldots Kx_{12}$ received through the selected pattern register K from the second, third . . . m-th addition code storage circuits J-2, J-3 . . . J-m are all "0". Accordingly the bit check operations performed by the logic circuit 21 find non-coincidence, so that the output BCK of the bit checking circuit L is logical "1". The "1" logic is maintained at least until the end of the first computation operation for all combinations. As to the inputs $S_1, S_2,$ BCK applied to AND gate 17, therefore, $S_2$ is "0" and $S_1$, BCK are both "1", so that the output of AND gate 17 remains "0". The addition code storage circuit J therefore does not store the code $X_1$ selected by the addition code selection circuit G. Furthermore, the result of the allowable error limit checking operation performed by the adding comparison circuit H, namely the output $S_3$ of AND gate 16, is logical "0". This signal is applied to AND gate 5 following inversion but, since the other input to the AND gate 5 is "0", the Q output of flip-flop FF remains "0".

The adding comparison circuit H performs addition and comparison operations successively in accordance with the addition combination codes $X_2, X_1 + X_2$ delivered by the counter 2 of addition code selecting circuit G, and the bit checking circuit L performs the bit checking operation at the same time, in the manner set forth above. Since the output BCK of bit checking circuit L is logical "1" until the computation of all combination ends, as mentioned above, the output of AND gate 17 will go to logical "1" in accordance with the timing of the next timing pulse from the clock pulse generator 1 of the addition code selecting circuit G when the outputs $S_1, S_2$ of the sum comparator P and weight comparator Q both are at logical "1", namely when $\alpha < \beta$, $\alpha \geq a_o$ hold. In response to the "1" output of AND gate 17, the addition combination code selected by the addition code selecting circuit G is stored in the addition code storage circuit J.

When at least one of the outputs $S_1, S_2$ of the sum comparator P and weight comparator Q is logical "0", on the other hand, the code stored in the addition code storage circuit J is carried over to the next code combination computation operation without being updated.

Upon completion of the computations for all combinations in the above fashion, the 13th bit output $Q_{13}$ of counter 2 in the addition code selecting circuit G goes to logical "1", so that AND gate 4 produces the computation completion signal in accordance with the timing of the next clock pulse, thereby halting the delivery of the clock pulses from the clock pulse generator 1. If the output $S_3$ of adding comparison circuit H for checking the allowable error limits is logical "1" at this time, that is, if the sum $\beta$ of the addition combination code stored in the addition code storage circuit J is between the upper limit setting c and the lower limit setting b, i.e., $b \leq \beta \leq c$, then the output of AND gate 6 will be logical "1", as will the output of AND gate 15a, corresponding to the first addition code storage circuit J-1, which AND gate is one of the AND gates 15a, 15b . . . 15m constituting the storage command signal generating circuit $G_2$, said AND gate receiving also the "1" output of the first bit of decoder counter R. Thus, the storage command pulse $CP_1$ is delivered to the first addition code storage circuit J-1. Next, in response to the pulse $CP_1$, the addition combination code contained in the addition code storage circuit J is stored in the first addition code storage circuit J-1. The pulse $CP_1$ is sent to the discharge control circuit M and, through the OR gate 24, to the drive motor of the conveyor D. The conveyor D therefore starts running, and the control circuit $M_a$ of the discharge control circuit M delivers the discharge signals $d_1, d_2 \ldots$ to the weighing machines corresponding to the addition combination code which is stored in the first addition code storage circuit J-1, whereby the weighing hoppers of the corresponding weighing machines discharge their articles successively into the bucket $E_1$ of conveyor D, where they are collected. This will be described in further detail below. The weight of the articles collected in the bucket $E_1$ will be within the allowable error limits and will have a value equal or closest to the set weight value $a_o$.

When the AND gate 4 issues the computation completion signal, the Q output of flip-flop FF remains logical "0" since the output $S_3$ of the adding comparison circuit H is now logical "1", as mentioned above. Meanwhile, only the second bit of the decoder output from decoder counter R goes to logical "1" owing to the clock signal CLK which enters the binary counter 8 of the decoder counter R after a time delay due to the delaying action of the delay circuit 12. In consequence, the selected pattern register K supplies the bit checking circuit L all of the memory data in the addition code storage circuits with the exception of the second addition code storage circuit J-2 selected by the decoder output of the decoder counter 2. In this case, however, what the first addition code storage circuit J-1 now sends to the bit checking circuit L is the stored combination code, namely the combination code closest to the weight value $a_o$.

As the conveyor D runs and the articles are being successively collected in the bucket $E_1$, a computation start signal, as from the packing machine, is again applied to the electronic computing circuit of FIG. 2 to initiate the second combination computation operation. In other words, in the second combination computation, the best combination code, namely that which is equal or closest to the set weight value $a_o$ and which is within the allowable error limits, is selected from the addition combination codes which remain after the exclusion of the addition combination code related to the code presently stored in the first addition code storage circuit J-1.

If we assume that $X_1 + X_2$ is the best addition combination code presently stored in the first addition code storage circuit J-1 as the combination code which is within the allowable error limits and equal or closest to the set weight value $a_o$, then the best combination within the allowable error limits and equal or closest to the set weight value $a_o$ will now be selected from among the combinations of the code numbers $X_3$ through $X_{12}$ that remain because of the exclusion of the code numbers $X_1, X_2$.

When the second computation start signal arrives, the outputs $Q_1, Q_2 \ldots Q_{13}$ of the counter 2 in addition code selecting circuit G are again cleared to "0", and the clock pulse generator 1 sends a clock pulse to counter 2 which responds by generating combination patterns, namely the addition combination codes, delivered from its outputs $Q_1, Q_2 \ldots Q_{12}$, just as described previously. At the same time, the code outputs $x_1, x_2 \ldots x_{12}$ of the addition code storage circuit J are cleared to logical, "1", placing the circuit in the full code selection state. Although the computation start signal is delivered also to the AND gate 7, the Q output of flip-flop FF is still "0", so that the output of AND gate 7 remains logical "0". Meanwhile, since the decoder output of the decoder counter R changed state upon the completion of the previous combination computations so that now only the second bit is logical "1", the selected pattern register K now provides the bit checking circuit L with the addition combination code $X_1 + X_2$ stored in the first addition code storage circuit J-1. In other words, the inputs $Kx_1, Kx_2$ to the circuit L are both logical "1".

Then, as described above in connection with the previous combination computation, the sum comparator P in adding comparison circuit H compares the sums $\alpha$, found by the first adder N-1, of the prevailing combination codes corresponding to the addition combination codes produced successively by the counter 2 of addition code selecting circuit F, with the sum $\beta$, found by the second adder N-2, of the addition combination code stored in the addition code storage circuit J. Also, the lower limit setting comparator r and the upper limit setting comparator s compare $\beta$ with the lower limit setting b and the upper limit setting c, respectively. In the bit checking circuit L, meanwhile, a bit check operation is performed upon each of the current combination codes and the best combination code, which is obtained from the first combination computation operation and is stored in the first addition code storage circuit J-1.

As a result, when $\alpha < \beta$, $\alpha \geq a_o$ hold, namely when the comparator outputs $S_1, S_2$ are both logical "1" and the bit check output BCK also is logical "1", the combination code prevailing at that time is stored in the addition code storage circuit J in accordance with the timing of the next clock pulse. In a case where at least one of the three outputs $S_1, S_2$, BCK is not logical "1", the combination code prevailing at that time is not stored in the addition code storage circuit J. In other words, the stored code is carried over to the next code combination computation operation without being updated.

The reason for not updating the stored code when the output BCK of the bit checking circuit L is logical "0" is as follows. When the articles selected by the first set of combination computations are being collected successively in the bucket $E_1$, the second and subsequent combinatorial computations are being carried out. Accordingly, the above arrangement is adopted to prevent the addition combination codes related to the best combination codes selected previously, or to the code numbers thereof, from being selected as a best combination code in subsequent combinatorial computations.

Upon completion of the second set of computations for all combinations carried out in the above fashion, and in the same manner as described previously, the 13-th bit $Q_{13}$ of the counter 2 in addition code selecting circuit G goes to logical "1", and AND gate 4 delivers the computation completion signal to halt the delivery of the clock pulses from the clock pulse generator 1. Since the second bit output of decoder counter R is logical "1", storage command signal generating circuit $G_2$ delivers the storage command pulse $CP_2$ to the second addition code storage circuit J-2. In response to the pulse $CP_2$, the combination code which is stored in the addition storage circuit J and which is equal or closest to the set weight value $a_o$, namely the best combination code, now is stored in the second addition code storage circuit J-2. The pulse $CP_2$ is sent to the discharge control circuit M, and through the OR gate 24 to the conveyor D, whereby the articles are discharge successively for collection in the bucket $E_2$ from the weighing hoppers of the weighing machines corresponding to the best combination code, which is now stored in the second addition code storage circuit J-2.

Meanwhile, as in the previous combinatorial computation operation, the output $S_3$ of the adding comparison circuit H now is logical "1", so that the Q output of flip-flop FF remains logical "0". Meanwhile, only the third bit of the decoder output from decoder counter R goes to logical "1" owing to the clock signal CLK which enters the binary counter 8 of the decoder counter R after a time delay due to the delaying action of the delay circuit 12. The selected pattern register K therefore supplies the bit checking circuit L all the memory data in the addition storage circuits excluding the third addition code storate circuit J-3 selected by the decoder output of the decoder counter R. Now, however, what the first and second addition code storage circuits J-1, J-2 send to the bit checking circuit L are the two combination codes stored therein.

As the conveyor D runs and the articles selected by the first and second combinatorial computations are being successively collected in the buckets $E_1$ and $E_2$, respectively, a computation start signal, as from the packing machine, is again applied to the electronic computing circuit of FIG. 2 to carry out the third combinatorial computation. In this third combination computation, through the same method described above, the best combination code, namely that which is equal or closest to the set weight value $a_o$ and which is within the allowable error limits, is selected from the addition combination codes which remain after the exclusion of the addition combination codes related to the codes presently stored in the first and second addition code storatge circuits J-1, J-2. The articles selected by this combinatorial computation are collected in bucket $E_3$.

Thus, the collection of the articles selected by the first combinatorial computation is completed, the emptied weighing hoppers which have completed the discharge of their articles are resupplied with articles from the pool hoppers, m-number of combinatorial computations are performed by the time a condition is attained wherein said weighing hoppers can participate again in a combinatorial computation, and whenever a combinatorial computation ends, the operation for collecting the articles selected by that combinatorial computation starts.

Upon the completion of the m-th combinatorial computation, the decoder counter R returns to its initial state, with the decoder output assuming the state wherein only the first bit is logical "1", after which the (m+1)-th combinatorial computation starts. At this time the bit checking circuit L receives the addition codes stored in the second, third ... m-th addition code storage circuits J-2, J-3 ... J-m, namely the addition codes selected by the second through m-th combinatorial computations. The bit checking circuit does not receive the addition code selected by the first combinatorial computation, which code is stored in the first addition code storage circuit J-1. No problem is encountered when the (m+1)-th combinatorial computation starts because the weighing hoppers selected by the first combinatorial computation will have been resupplied with articles and a condition will have attained allowing them to participate in the combinatorial computation.

The foregoing operations are repeated continuously in automatic fashion to perform the (m+2)-th, (m+3)-th ... (2m+1)-th, (2m+2)-th ... combinatorial computations and so on.

Therefore, $\beta$ found by the second adder N-2 in the adding comparison circuit H is a sum other than that connected with the addition combination codes related to each combination code and to each of the code numbers thereof, namely a sum which includes the smallest error with regard to the set weight value. Thus, $\beta$ represents a value closest to the set weight value. Accordingly, the addition code storage circuit J stores the addition combination code closest to the set weight value, namely the best combination code, from among combination codes excluding the addition combination codes related to the best combination codes selected by previous combinatorial computations and to each of the code numbers thereof. The sum comparator P compares the sum of the presently prevailing combination code with the previous value which was closest to the set weight value. The addition code storage circuit J is updated only when the presently prevailing value is closer to the set value than past values, based on the result of the comparison operation, and is other than the values connected with the addition combination codes related to the best combination codes selected by previous combinatorial computations and to each of the code numbers thereof.

At the end of the calculations for all combinations in each combinatorial combination operation, the Q output of flip-flop FF goes to logical "1", in response to the computation completion signal from AND gate 4, when the output $S_3$ of the adding comparison circuit H, for the purpose of checking the allowable error limits, goes to logical "0", namely when the sum $\beta$ for the addition combination code, stored in the addition code storage circuit J as the combination closest to the set weight value $a_o$, is less than the lower limit setting b or greater than the upper limit setting c, i.e., when $\beta < b$ or $\beta > c$. The output of AND gate 6 remains logical "0", preventing the clock signal CLK from entering the decoder counter, R, so that the decoder output of the decoder counter R does not change. The storage command signal generating circuit $G_2$ therefore does not produce a storage command pulse CP, so that the addition combination code contained in the addition code storage circuit J is not stored in any of the first, second ... m-th addition code storage circuits J-1, J-2 ... J-m. The discharge control circuit M does not send a discharge signal to the weighing machines, and the selected pattern register K does not change.

When the next computation start signal arrives, the code outputs $x_1, x_2 \ldots x_{12}$ of the addition code storage circuit J are each cleared to "1" in response to the signal, placing this circuit in the full code selection state, and the output of AND gate 7 goes to logical "1". Of the AND gates 13a, 13b ... 13m in present signal generating circuit $G_1$, the output of the AND gate selected by the decoder counter R goes to logical "1", thereby presetting to logical "0" each of the code outputs of that addition code storage circuit J-1, J-2 ... J-m which receives the output of said AND gate in the preset signal generating circuit $G_1$. Thereafter the combinatorial computations continue to find and revise the best combination codes. It should be noted that the Q output of the flip-flop FF reverts from "1" to "0" immediately after the start of a combinatorial computation in response to the $Q_2$ output of counter 2 in the addition code selecting circuit G and a clock pulse from the clock pulse generator 1 (see FIG. 2).

In a case where, upon the end of a combinatorial computation, the combination code stored in the addition code storage circuit J as the best combination code is judged to be outside the allowable error limits so that the allowable limit check signal $S_3$ goes to logical "0", an alarm is issued to stop the operation of the entire weighing system, or the conveyor D is run backwards, all of the weighing hoppers are caused to release their articles into the buckets, the articles are discharged from the buckets at a suitable location at one end of the conveyor D, all of the weighing hoppers are resupplied with articles, and combinatorial computations then are performed again for all weight values, or a circuit is provided for performing combinatorial computations again for all weight values after at least one of the weighing hoppers is provided with an additional amount of the articles.

Since the above-described combinatorial computations are performed for the weight of the articles in each weighing hopper, namely on the basis of the weight values, the weighing machines may be set individually to article weights or to article numbers. Accordingly, the set weights can be extracted selectively automatically as long as each weighing machine produces a weight signal indicative of the contents of its weight hopper. In a case where a condition limiting the number of articles is imposed in addition to the weight setting, combinations of the addition codes are selected in such a manner that the number of combination codes provides the desired number of articles, with the number of articles charged into each weighing hopper by each charging operation being fixed. Then the set weights need only be calculated as set forth above.

The adding comparison circuit H of this embodiment of the present invention performs the adding and the comparing operations on the basis of analog values, as illustrated in FIG. 7. It is obvious, however, that a circuit which performs these operations on the basis of digital signals may be employed.

Also, in this embodiment of the present invention, the addition code selecting circuit G employs a (N+1)-bit binary counter to generate the addition code combination patterns. In such case the opportunities for the first and N-th weighing machines to be selected in combinatorial computations differ greatly with time. The selection and non-selection of the first weighing machine changes with each clock pulse, whereas the N-th weighing machine is selected only after the $(2^{N-1})$-th clock pulse (see FIG. 14). Therefore, since the combinatorial computation speed is decided by the analog adding comparison circuit (FIG. 7) and by the clock pulses, and since the window time with respect to external noise differs, the probability that all of the weighing machines will be chosen equally vanishes. This influences the durability of the apparatus. Accordingly, in order to equalize the probability of selection, it is possible to employ a method of generating combination patterns by means of a pseudo-random signal such as an M-series signal.

The electronic computing circuit of the present invention, as shown in FIG. 2, can be applied also to a so-called combinatorial counting apparatus which operates by converting the weight values, measured by the respective weighing machines, into values indicative of the numbers of articles by dividing each weight value by the unit weight of the articles, performing combinatorial computations regarding the number of articles, and providing articles of a number equal or closest to a set number. In such case the values indicative of the number of articles in the weighing hoppers need only be input to the circuitry in place of the weight values $a_1, a_2 \ldots a_n$.

The foregoing description is for a case where a major improvement in weighing capability is achieved by causing the weighing hoppers to discharge articles corresponding to the best combination, which gives a value equal or closest to the set target value, supplying these weighing hoppers with articles afresh, and finding the best combination, which gives a value equal or closest to the set value, from the values of the articles presently remaining in the weighing hoppers, said operation of finding the best combination being performed a plurality of times before the values of the articles supplied to said weighing hoppers participate again in a combinatorial computation. However, reference will now be had to the block diagram of FIG. 15 to describe the arrangement of an electronic computing circuit for a case where the number of weighing hoppers is limited or where a great improvement is weighing capability is unnecessary. With this circuit the above operation is performed only one time, namely the operation of finding the best combination, which gives a value equal or closest to the set value, from the values of the articles presently remaining in the weighing hoppers.

Specifically, if the operation of finding the best combination, which gives a value equal or closest to the set value, from the values of the articles presently remaining in the weighing hoppers is to be performed not a plurality of times but only once, then the first and second addition code storage circuits J-1, J-2 will suffice as the addition code storage circuits which are to store, in response to storage command pulses CP, the best addition code stored in the addition code storage circuit J.

Figure 15:
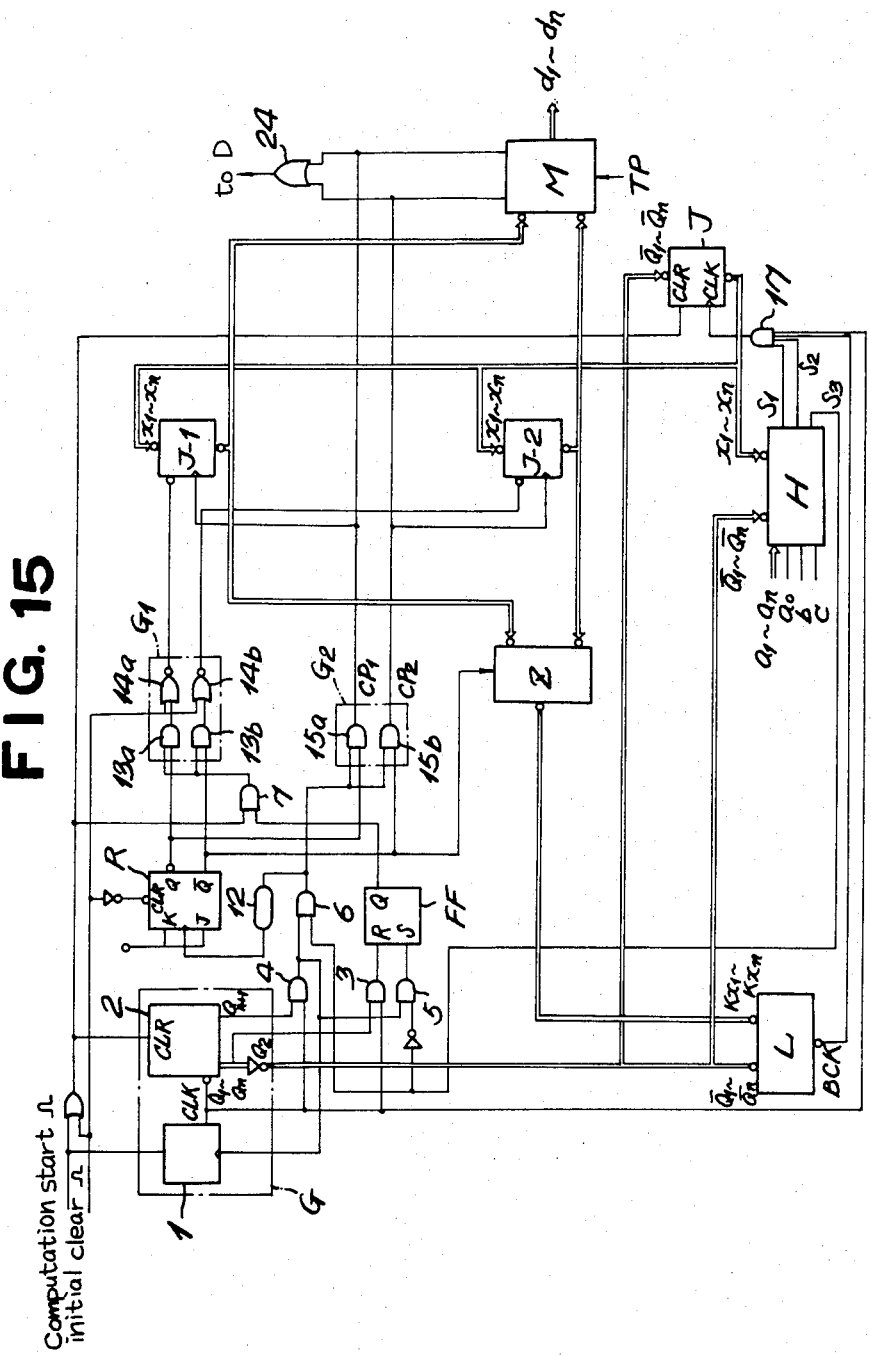
FIG. 15 is a block wiring diagram illustrating another embodiment of an electronic computing circuit according to the present invention.

Further, since the storage command signal generating circuit $G_2$ which delivers the storage command pulses $CP_1$, $CP_2$ to the first and second addition code storage circuits J-1, J-2 need provide signals only to these two addition code storage circuits J-1, J-2, it suffices if the circuit is composed of the two AND gates 15a, 15b, as shown in FIG. 15. Likewise, since the preset signal generating circuit $G_1$ which delivers the preset signal to the first and second addition code storage circuits J-1, J-2 also need provide this signal only to these two addition code storage circuits J-1, J-2, it suffices if this circuit is composed of the two AND gates 13a, 13b and the two NOR gates 14a, 14b.

Also, the decoder counter R, upon each arrival of the clock signal CLK via the delay circuit 12, need only deliver a high-level signal alternatingly to the two AND gates 13a, 13b in the preset signal generating circuit $G_1$ and to the two AND gates 15a, 15b in the storage command signal generating circuit $G_2$. A flip-flop may therefore be used for the decoder counter R.

The bit checking circuit L, moreover, need only receive the memory data from whichever of the first and second addition code storage circuits J-1, J-2 is not selected by the decoder counter R. Consequently, the selected pattern register K shown in FIG. 2 may be dispensed with and replaced by a multiplexer Z.

The control circuits constituting the discharge control circuit M need only be two in number, namely $M_a$ and $M_b$, the two control circuits $M_a$, $M_b$ corresponding to the first and second addition code storage circuits J-1, J-2.

In other aspects the circuit is structurally similar to that of FIG. 2 and operates in the same manner as the above-described embodiment. The only difference is that whereas the foregoing embodiment performs the operation of finding the best combination, which gives a value equal or closest to the set value, from the values of the articles presently remaining in the weighing hoppers a plurality of times, the present invention performs the operation only one time.

Described next will be the operation of opening the weighing hoppers of the weighing machines corresponding to the best combination code provided by a combinatorial computation, and gathering the articles, released from the weighing hoppers, in one of the buckets $E_1$, $E_2$ ... $E_n$ of the conveyor D.

First, the positions of the buckets $E_1$, $E_2$ ... $E_n$ are mechanically predetermined in such a manner that one bucket $E_1$ of conveyor D, shown in FIG. 1, is positioned directly below the weighing hopper $B_1$ of the first weighing machine $A_1$ at the instant a computation completion signal is generated, and that as the bucket $E_1$ travels and then arrives directly below, say, the seventh weighing hopper $B_7$, the next bucket $E_2$ is positioned directly below the first weighing hopper $B_1$, at which time the next computation completion signal is generated.

When the computation completion signal is delivered by the AND gate 4 and a storage command pulse CP is generated by the storage command pulse generating circuit $G_2$, the best combination code stored in addition code storage circuit J is transferred, for storage, to one of the first, second ... m-th addition code storage circuits J-1, J-2 ... J-m in response to said pulse, as described above. Said pulse is transmitted to the conveyor D and to the discharge control circuit M. The conveyor D starts running and the timing pulse generator F, which is synchronized to the conveyor D, sends the discharge control circuit M a discharge timing pulse TP each time a bucket arrive directly below a weighing hopper. Assume now that the storage command signal generating circuit $G_2$ produces the storage command pulse $CP_1$. When this occurs, the pulse enters the pulse generating circuit 22 of the control circuit $M_a$, in the discharge control circuit M of FIG. 12, corresponding to the first addition code storage circuit J-1. At this time bucket $E_1$, by way of example, is located directly below the first weighing hopper $B_1$. Therefore, pulses from outputs $Q_A$ to $Q_L$ enter the logic circuit 23 sequentially in time upon each arrival of a discharge timing pulse TP produced when the bucket $E_1$ arrives directly below one weighing hopper after another as the bucket travels.

If we assume that $X_2 + X_5$ was the best combination code transferred, for storage, to the first addition code storatge circuit J−1 from the addition code storage circuit J in response to the storage command pulse $CP_1$, then each $x_2$, $x_5$ input to the control circuit $M_a$ will be logical "1". When bucket $E_1$ arrives directly below each of the second and fifth weighing hoppers $B_2$, $B_5$, the "1" outputs $Q_B$, $Q_E$ of the pulse generating circuit 22 will coincide with $x_2$, $x_5$, respectively, whereby the logic circuit 23 will transmit the discharge signals $d_2$, $d_5$ successively to the corresponding weighing hoppers $B_2$, $B_5$. As a result, the weighing hoppers discharge their articles successively into the bucket $E_1$ for collection.

The value of the articles collected in bucket $E_1$ will be that which is within the allowable error limits and equal or closest to the set weight.

The other control circuits $M_b$ ... $M_m$ operate in the same manner as control circuit $M_a$ when the pulse generating circuit 22 receives the respective storage command pulses $CP_2$ ... $CP_m$.

In a case where a best combination code exists every time a combinatorial computation is performed, storage command pulses $CP_1$, $CP_2$ ... $CP_m$ are generated by the storage command signal generating circuit $G_2$ when each of the combinatorial computations end. Accordingly, while the conveyor is being driven continuously, separate buckets receive the articles from the weighing hoppers corresponding to the best combination codes stored in the first, second ... m-th addition code storage circuits J-1, J-2 ... J-m.

In the embodiment of FIG. 1, one conveyor D and a plurality of buckets $E_1$, $E_2$ ... $E_n$ are used to collect the articles from all of the weighing hoppers. However, by employing two conveyors with, say, 12 weighing machines, one conveyor may be used to collect the articles from the first through sixth weighing hoppers, and the other to collect the articles from the seventh through twelfth weighing hoppers, whereby collection efficiency can be improved.

Also, instead of the conveyor means for collecting the articles, the weighing machines can be arranged on a circle and the articles corresponding to the best combination code can be discharged simultaneously from the weighing hoppers and collected at one location via a single collecting chute. In such case, however, the falling distance within the chute is substantial so that the interior of the collecting chute must be specially designed or provided with means to prevent mixing between articles discharged by a previous operation and articles discharged by a subsequent operation.

In the case described above, 12 weighing machines are used for the combinatorial weighing operation. In actual practice, however, it is preferable to carry out the combinatorial computations using a greater number of weighing machines in order to execute the operation of discharging articles from the weighing hoppers, supply said weighing hoppers with articles, and perform a predetermined number of combinatorial computations using the remaining weighing hoppers before a condition is attained wherein the abovementioned weighing hoppers can participate again in a combinatorial computation.

Figure 16:
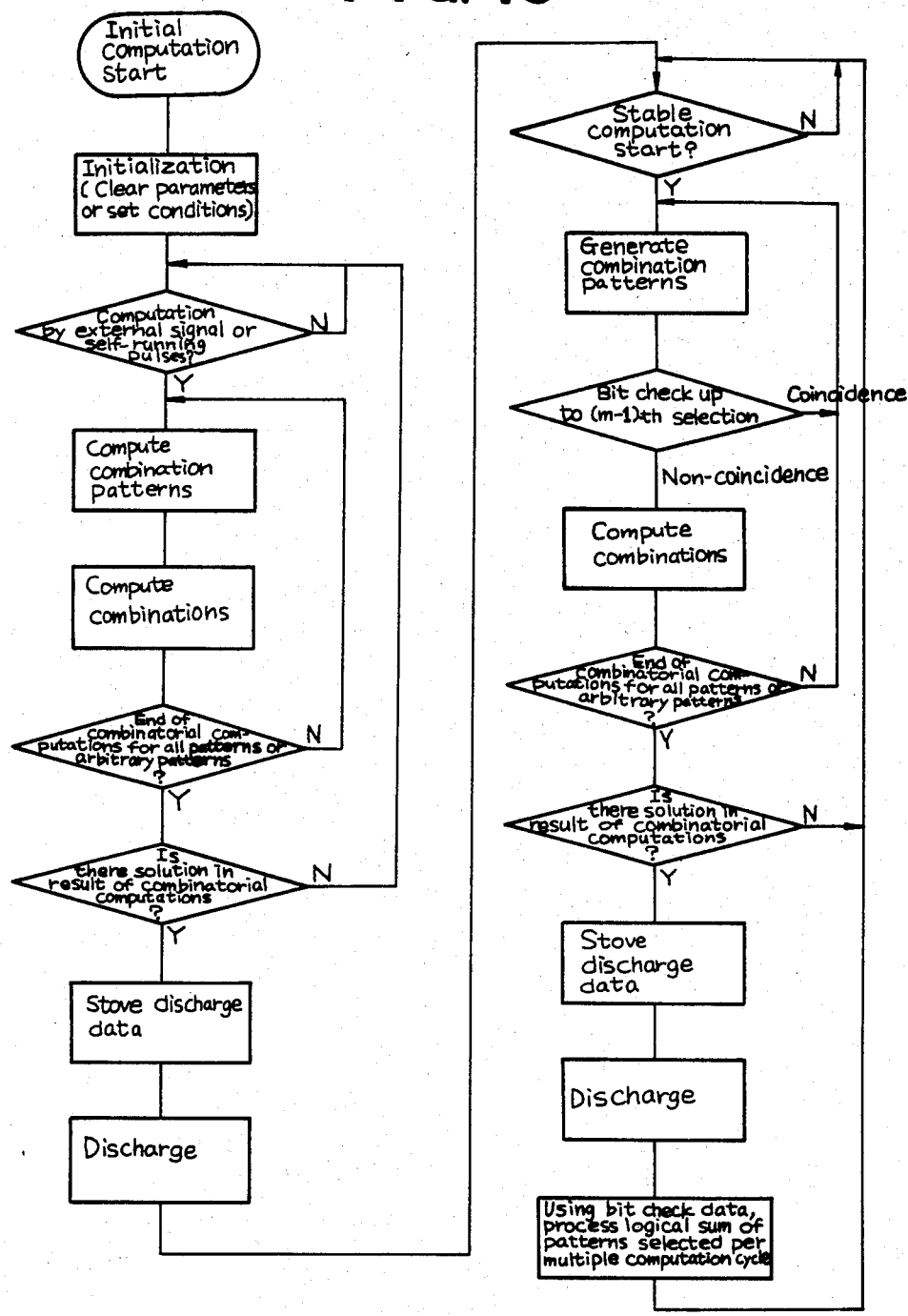

The electronic computing circuits shown in FIGS. 2 and 15 are illustrated in the form of hardware circuitry in order to describe the operation of the invention is detail. In actual practice, however, it is required to add various checking functions. Accordingly, processing by software is preferred through use of a microcomputer, microprocessor or the like. One example of a program is such case is shown by means of the flowchart of FIG. 16. This flowchart, it should be noted, corresponds to the electronic computing circuit depicted in FIG. 2.

As many apparently widely different embodiments of the present invention can be made without departing from the spirit and scope thereof, it is to be understood that the invention is not limited to the specific embodiments thereof except as defined in the appended claims.

What is claimed is:

1. A combinatorial weighing method comprising the steps of:

(a) charging a plurality of weighing hoppers with articles-to-be-weighed;

(b) producing a weight value signal representative of said articles-to-be-weighed contained in each weighing hopper;

(c) computing a best combination of said weight value signals that gives a value equal to or closest to a set value;

(d) selecting the weighing hoppers containing said best combination and successively discharging from said weighing hoppers the weighed articles which correspond to said best combination;

(e) recharging said discharged weighing hoppers; and (f) repeating steps (b), (c), (d), and (e) for the remaining hoppers, omitting each of said selected weighing hoppers from step (c) for a predetermined number of cycles before permitting it to participate again.

2. A combinatorial weighing method as described in claim 1 wherein said predetermined number of cycles is a fixed number greater than one.

3. A combinatorial weighing method as recited in claim 1 wherein step (d) further includes producing discharge signals representative of the time at which one of a plurality of buckets on a conveyor is situated directly below a respective weighing hopper, and successively discharging said selected weighing hoppers in timed sequence in response to said discharge signals to collect said best combination of weighed articles in said one bucket.

4. A combinatorial weighing apparatus comprising:

a plurality of weighing machines having weighing hoppers;

means for supplying articles-to-be-weighed to said weighing hoppers;

means for producing a signal representative of a value of said articles-to-be-weighed in each of said weighing hoppers;

an electronic computing circuit for computing a best combination of said values that gives a total value equal to or closest to a set value;

means responsive to said computing circuit for selecting the ones of said hoppers containing said best combination and for successively discharging from said selected hoppers the weighed articles which correspond to said best combination; and means for providing said discharged weighing hoppers with a fresh supply of articles-to-be-weighed;

said electronic computing circuit being arranged to repeat the computing operation and to omit each of said selected hoppers from computation of said best combination for a predetermined number of said computations before it can participate again.

5. A combinatorial weighing apparatus as claimed in claim 4 further comprising:

a plurality of conveyor buckets arranged to pass directly below said weighing hoppers;

means in said electronic computing circuit for producing discharge signals corresponding to the times when each of said buckets passes below each of said weighing hoppers; and means responsive to said discharge signal for successively discharging said selected hoppers of said best combination in timed sequence as one of said buckets passes below said hoppers to collect said weighed articles corresponding to said best combination in said one bucket.

6. A combinatorial weighing apparatus as recited in claim 4 wherein said predetermined number is a fixed number greater than one.

* * * * *